(12) United States Patent
Sniezko et al.

(10) Patent No.: US 8,239,907 B2
(45) Date of Patent: Aug. 7, 2012

(54) METHODS AND SYSTEMS FOR DELIVERING DOCSIS SERVICES OVER HETEROGENEOUS ACCESS NETWORKS

(75) Inventors: Oleh Sniezko, Highlands Ranch, CO (US); Thomas Fong, Redwood Shores, GA (US); Vladimir Bronstein, Sunnyvale, CA (US)

(73) Assignee: Aurora Networks, Inc., Santa Clara, CA (US)

( * ) Notice: Subject to any disclaimer, the term of this patent is extended or adjusted under 35 U.S.C. 154(b) by 549 days.

(21) Appl. No.: 12/148,140

(22) Filed: Apr. 14, 2008

(65) Prior Publication Data
US 2009/0044240 A1  Feb. 12, 2009

Related U.S. Application Data

(60) Provisional application No. 60/923,284, filed on Apr. 13, 2007.

(51) Int. Cl.
*H04N 7/173* (2011.01)
(52) U.S. Cl. .......................... 725/111; 370/465; 370/466
(58) Field of Classification Search .................. None
See application file for complete search history.

(56) References Cited

U.S. PATENT DOCUMENTS
6,563,793 B1 * 5/2003 Golden et al. ................. 370/236
2006/0271988 A1 * 11/2006 Chapman et al. ............. 725/111

OTHER PUBLICATIONS

DOCSIS Cable Modem Technology, Fellows, et al.; Topics in Broadband Access, IEEE Communications Magazine, pp. 202-209, Mar. 2001.
International search report PCT/US08/004878, date of mailing of the international search report—Oct. 10, 2008.

* cited by examiner

*Primary Examiner* — Kristine Kincaid
*Assistant Examiner* — Chenea Smith
(74) *Attorney, Agent, or Firm* — John Bruckner PC

(57) ABSTRACT

Inserting protocol adaptation layers into access equipment to translate data over cable service interface specification services control messages to the corresponding messages in the other (multiple) heterogeneous access specification(s) includes AMTS DOCSIS-to-access protocol translation and AMTS access-to-DOCSIS protocol translation. A method of expanding DOCSIS into an alternative access network includes deploying a protocol adaptation layer in access equipment to translate DOCSIS control messages to corresponding messages for use in the alternative access network. Translating DOCSIS control messages to corresponding messages for use in the alternative access network includes AMTS DOCSIS-to-access protocol translation and AMTS access-to-DOCSIS protocol translation.

8 Claims, 8 Drawing Sheets

METHODS AND SYSTEMS FOR DELIVERING DOCSIS SERVICES OVER HETEROGENEOUS ACCESS NETWORKS

CROSS-REFERENCE TO RELATED APPLICATION

This application claims a benefit of priority under 35 U.S.C. 119(e) from provisional patent application U.S. Ser. No. 60/923,284, filed Apr. 13, 2007, the entire contents of which are hereby expressly incorporated herein by reference for all purposes.

BACKGROUND INFORMATION

1. Field of the Invention

Embodiments of the invention relate generally to the field of delivering data over cable service interface specification services over heterogeneous access network(s). More particularly, an embodiment of the invention relates to methods and systems for inserting protocol adaptation layers into access equipment to translate data over cable service interface specification services control messages to the corresponding messages in the other (multiple) heterogeneous access specification(s).

2. Discussion of the Related Art

Data Over Cable Service Interface Specification (DOCSIS) is an international standard developed by Cable Television Laboratories, Inc (CableLabs®) and has made delivery of broadband services over hybrid fiber coaxial (HFC) cable television systems using cable modems possible. Internet access, video on demand movies, telephony, telephony over the Internet, interactive games and a host of other applications are being offered based on the DOCSIS architecture.

DOCSIS defines the communications and operation support interface requirements for a data over cable system. It permits the addition of high-speed data transfer to an existing coaxial cable system. It is employed by most cable television operators to provide Internet access over their existing HFC infrastructure using cable modems. The first DOCSIS specification was version 1.0, issued in March of 1997. Since then, it gained worldwide acceptance and is ubiquitously deployed by cable operators around the world. It becomes the most popular subscriber and network management platform for residential and commercial broadband services over cable modems.

However, DOCSIS is only defined for cable modems over HFC systems and is not applicable when operators expand its coverage into alternative access networks, such as fiber and wireless. What is needed is an approach that expands DOCSIS into alternative (heterogeneous) access network(s).

SUMMARY OF THE INVENTION

There is a need for the following embodiments of the invention. Of course, the invention is not limited to these embodiments.

According to an embodiment of the invention, a method of expanding DOCSIS into an alternative access network, comprises deploying a protocol adaptation layer in access equipment to translate DOCSIS control messages to corresponding messages in the alternative access network. According to another embodiment of the invention, a system for expanding DOCSIS into an alternative access network, comprises a protocol adaptation layer in access equipment to translate DOCSIS control messages to corresponding messages in the alternative access network.

These, and other, embodiments of the invention will be better appreciated and understood when considered in conjunction with the following description and the accompanying drawings. It should be understood, however, that the following description, while indicating various embodiments of the invention and numerous specific details thereof, is given for the purpose of illustration and does not imply limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer concept of embodiments of the invention, and of components combinable with embodiments of the invention, and operation of systems provided with embodiments of the invention, will be readily apparent by referring to the exemplary, and therefore nonlimiting, embodiments illustrated in the drawings (wherein identical reference numerals (if they occur in more than one view) designate the same elements). Embodiments of the invention may be better understood by reference to one or more of these drawings in combination with the following description presented herein. It should be noted that the features illustrated in the drawings are not necessarily drawn to scale.

DESCRIPTION OF PREFERRED EMBODIMENTS

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

One solution to solve the problem of expanding DOCSIS into alternative (heterogeneous) access network(s)s to insert protocol adaptation layers in the access equipment to translate DOCSIS control messages to the corresponding messages in the other access specification(s). Benefits of the invention include at least the following:

The same DOCSIS broadband services can be offered over cable and non-cable access networks.

DOCSIS back office system (subscriber management system, network management system, security system, performance and fault monitoring system) can be used to manage equipment and devices developed for different access specifications.

The invention can include a method and system for delivering DOCSIS broadband services over multiple heterogeneous access networks. The invention can include a multi-access platform using DOCSIS.

Figure 1:
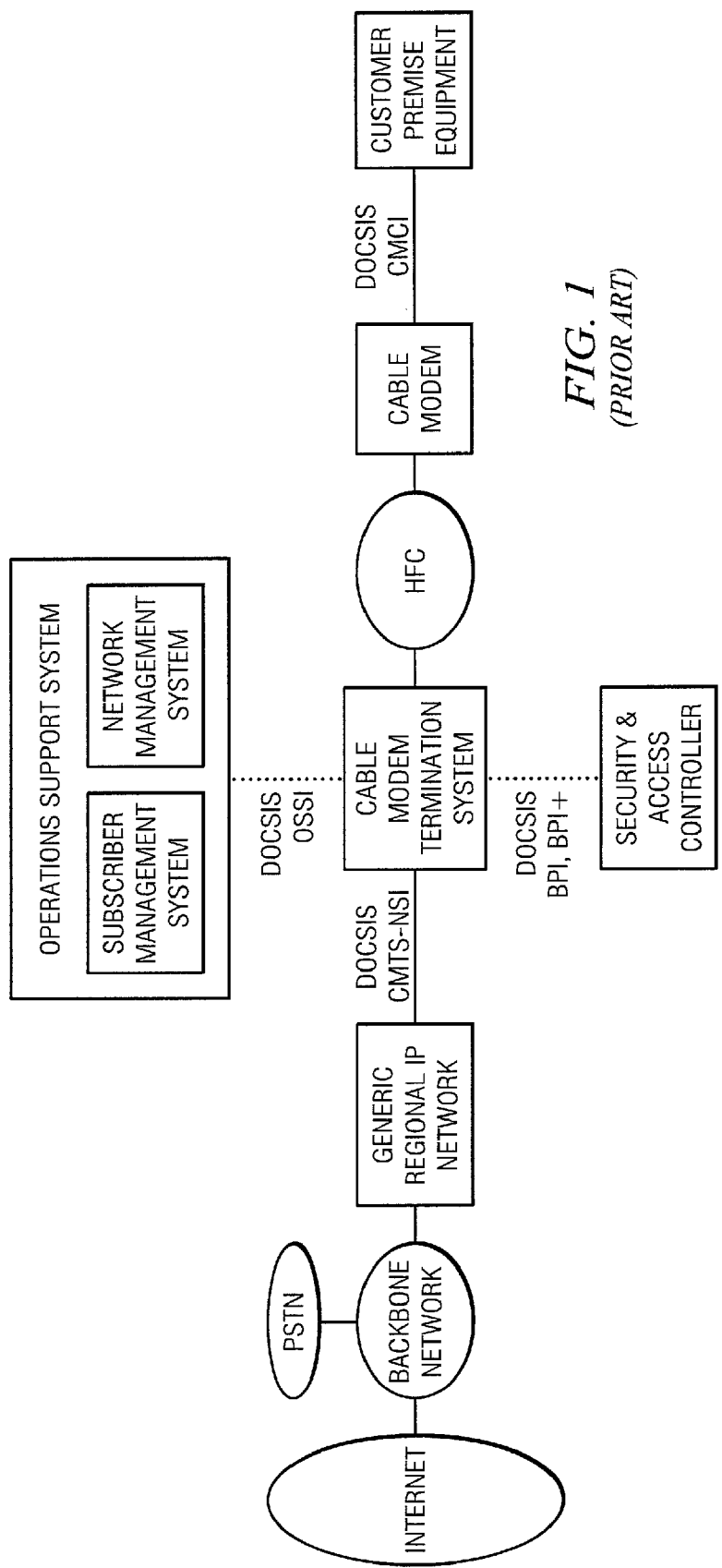
FIG. 1 is a block schematic view of a conventional, basic DOCSIS reference architecture, appropriately labeled "PRIOR ART."

FIG. 1 shows the Basic DOCSIS Reference Architecture, appropriately labeled prior art. The key interfaces defined by DOCSIS are:

Data Interfaces: The transmission path over the HFC system is realized at the head-end by a Cable Modem Termination System (CMTS), and at each subscriber location by a Cable Modem (CM). At the head-end, the interface to the data-over-cable system is called the Cable Modem Termination System—Network-Side Interface (CMTS-NSI). At the subscriber locations, the interface is called the cable-modem-to-customer-premises-equipment interface (CMCI).

Operation Support Systems Interfaces (OSSI): These are network element management layer interface between the network elements and the high-level OSSs (operations support systems) which support the basic business processes.

Baseline Privacy Interface and Baseline Privacy Plus Interface (BPI and BPI+): Baseline data-over-cable security is defined.

Figure 2:
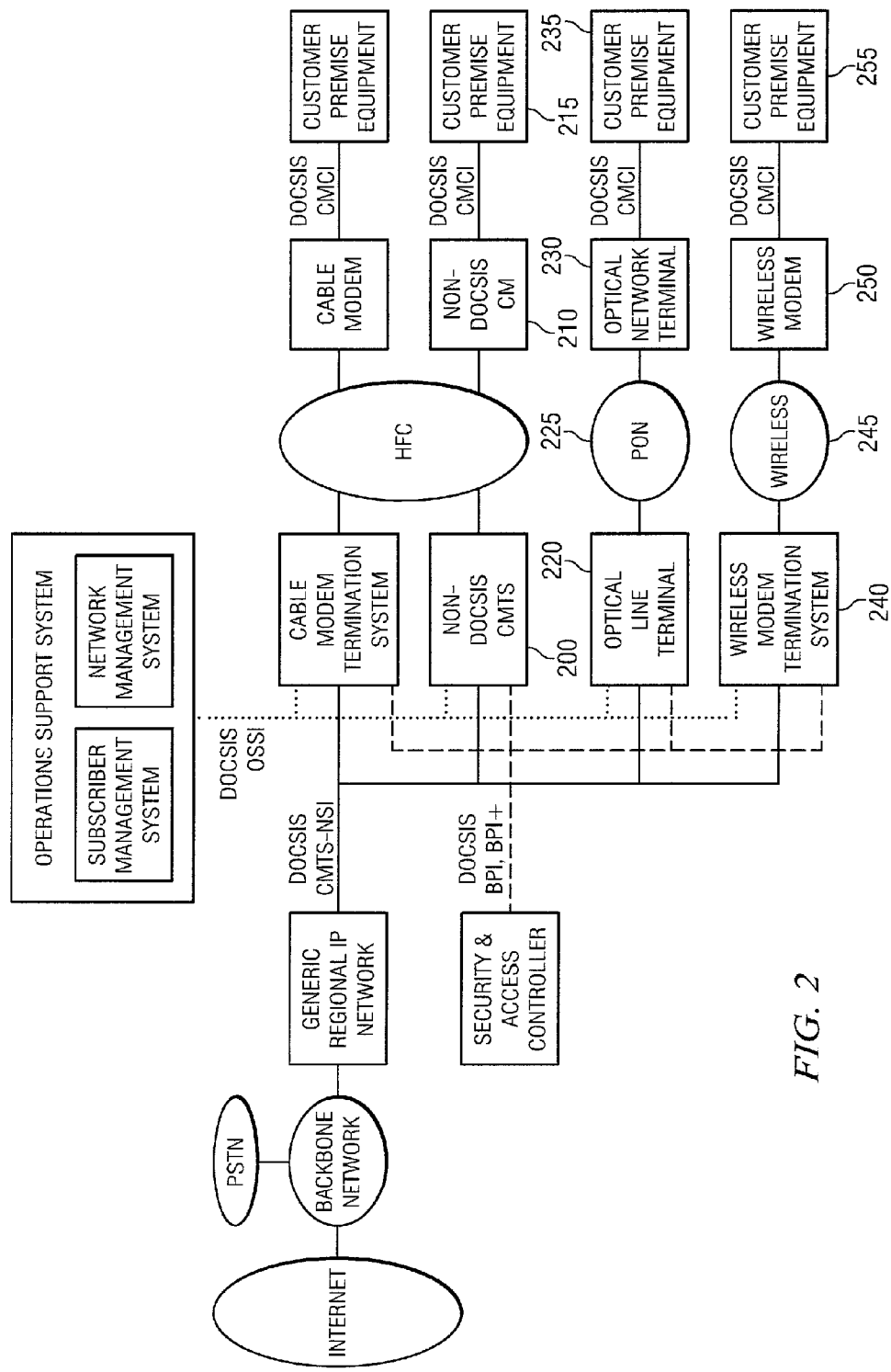
FIG. 2 is a block schematic view of a multi-Access DOCSIS reference architecture, representing an embodiment of the invention.

FIG. 2 shows the Multi-Access DOCSIS Reference Architecture. The protocol adaptation layers turns DOCSIS from a HFC platform into a generic access platform and can be deployed over at least the following access networks:

HFC system using non-standard CMTS and CM;

Passive Optical Networks (PON) using Optical Line Terminals (OLT) and Optical Network Terminals (ONT); and Wireless Networks using Wireless Modem Termination System (WMTS) and Wireless Modem (WM).

Still referring to FIG. 2, Non-DOCSIS CMTS 200 is coupled to the generic regional IP network and the hybrid fiber cable network, in parallel with the cable modem termination system. Non-DOCSIS CMTS 200 is also coupled to the subscriber management system and the security & access controller. The Non-DOCSIS CM 210 is coupled to the hybrid fiber cable network. Customer premise equipment 215 is coupled to the Non-DOCSIS CM 210. Optical line terminal 220 is coupled to the generic regional IP network. Optical line terminal 220 is also coupled to the subscriber management system and the security & access controller. Passive optical network 225 is coupled to the optical line terminal 220. Optical network terminal 230 is coupled to the passive optical network 225. Customer premise equipment 235 is coupled to the optical network terminal 230. Wireless modem termination system 240 is coupled to the generic regional IP network. Wireless modem termination system 240 is also coupled to the subscriber management system and the security & access controller. Wireless network 245 is coupled to the wireless modem termination system 240. Wireless modem 250 is coupled to the wireless network 245. Customer premise equipment 255 is coupled to the wireless modem 250.

Figure 3:
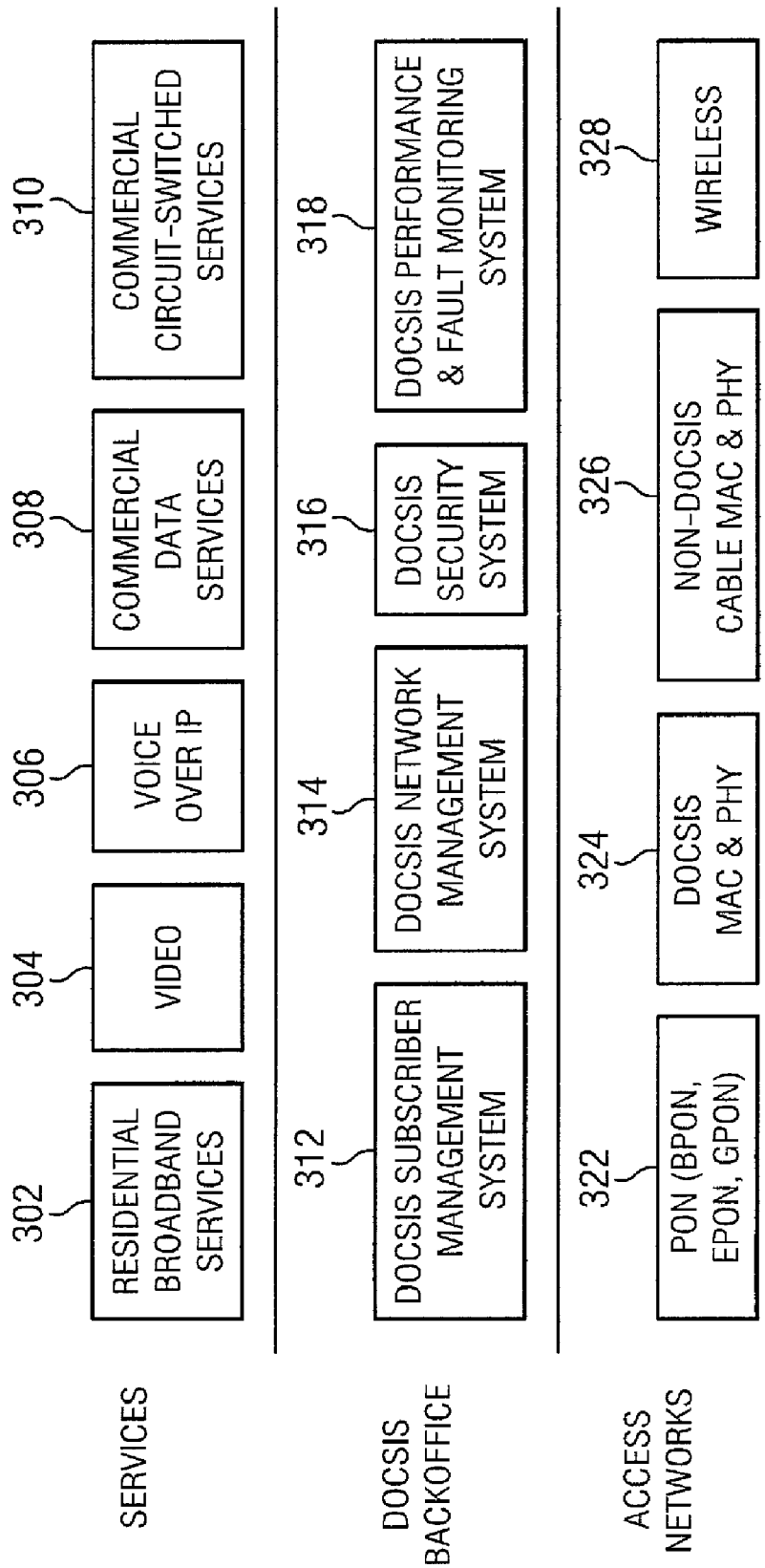
FIG. 3 is a block schematic view of a multi-access DOCSIS service architecture, representing an embodiment of the invention.

FIG. 3 displays the architecture of a Multi-Access DOCSIS Services platform. It illustrates how a range of broadband services from residential broadband services to commercial circuit-switched services, can be offered using DOCSIS over different access networks from PON to wireless. It is a major advantage of the invention that a single back office system can be used to manage these services simultaneously over different physical media.

Still referring to FIG. 3, this embodiment of the invention includes a services layer, a DOCSIS back office layer and an access networks layer. The services layer includes residential broadband services 302; video 304; voice over IP 306; commercial data services 308; and commercial circuit switched services 310. The DOCSIS back office layer includes DOCSIS subscriber management system 312; DOCSIS network management system 314; DOCSIS security system 316; and DOCSIS performance and fault monitoring system 318. The access networks layer includes PON (BPON, EPON, GPON) 322; DOCSIS MAC & PHY 324; Non-DOCSIS cable MAC & PHY 326; and wireless 328.

Figure 4:
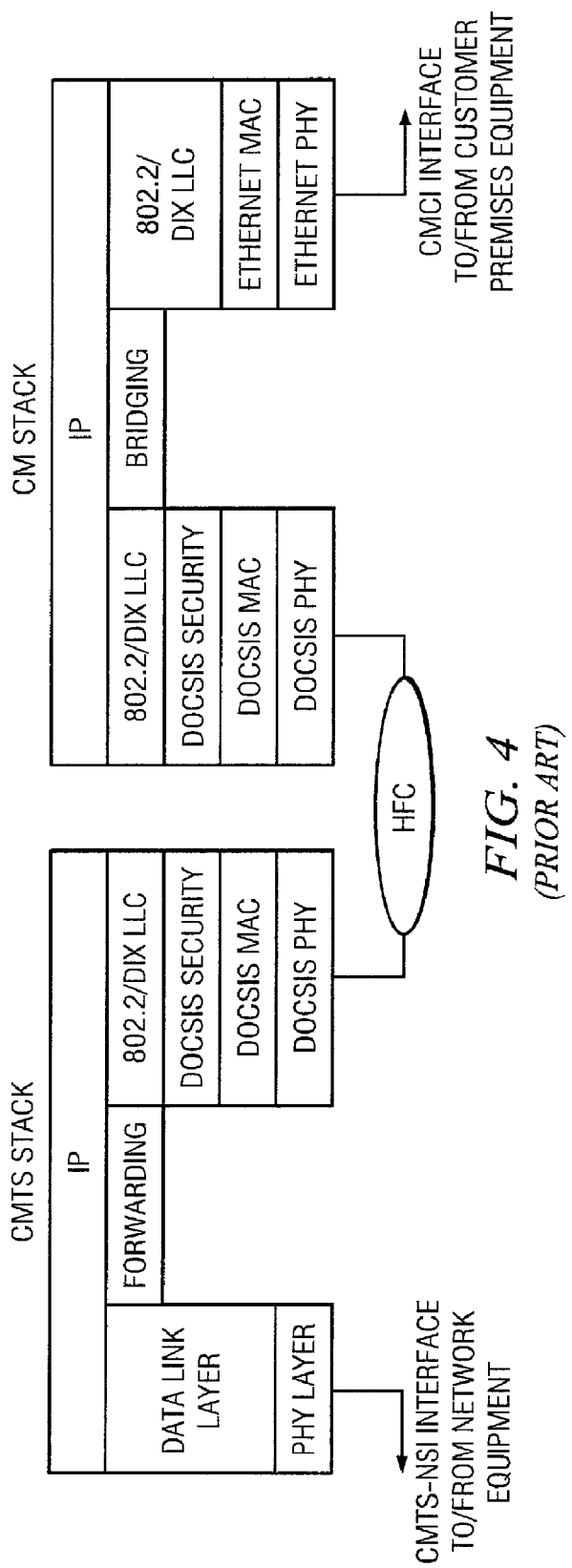
FIG. 4 is a block schematic view of a conventional DOCSIS protocol stack, appropriately labeled "PRIOR ART."

FIG. 4 shows the protocol stack defined by DOCSIS, appropriately labeled prior art. In this current (state-of-the-art) specification, the interfaces are only defined for HFC access networks.

Figure 5:
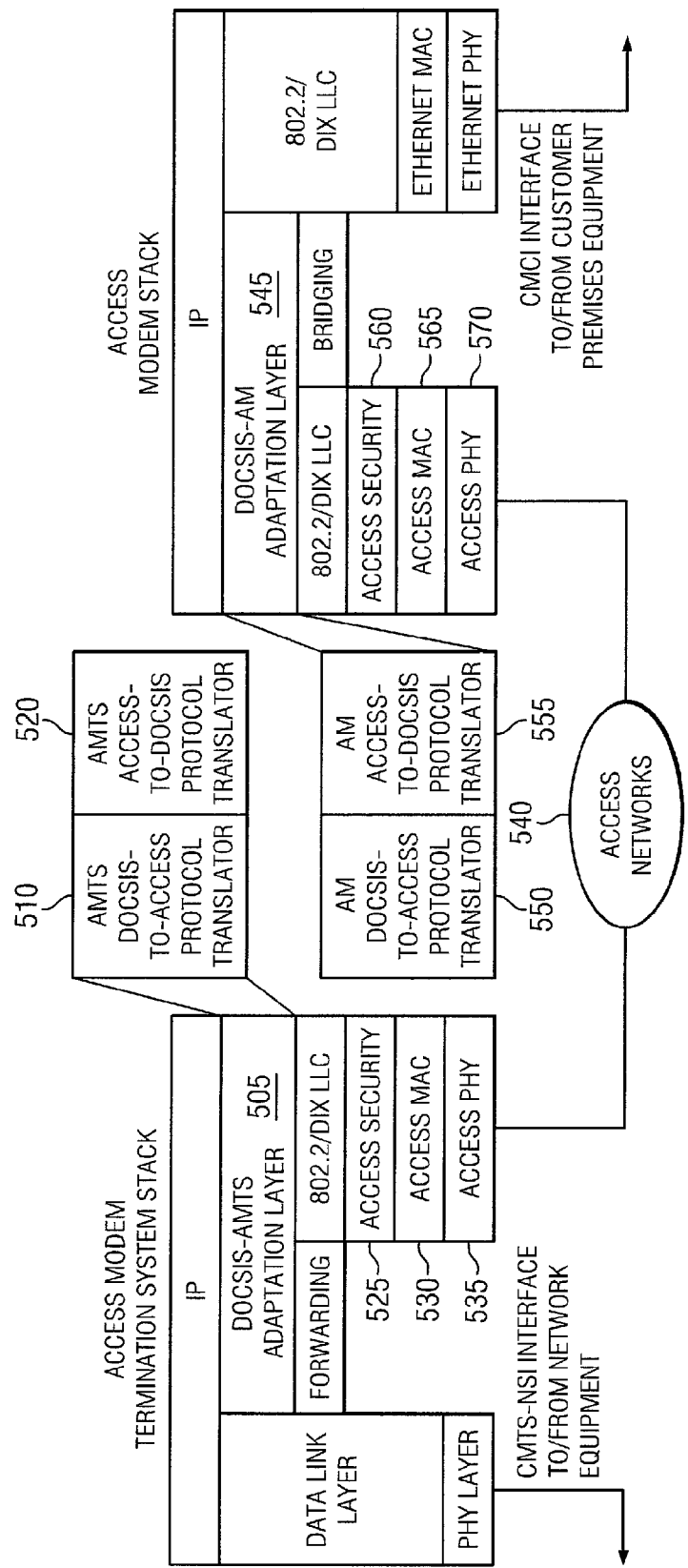
FIG. 5 is a block schematic view of a single DOCSIS protocol adaptation layer where access can be PON (BPON, EPON, GPON), Wireless (WiFi, WiMax, Proprietary), or Non-DOCSIS cable modem, representing an embodiment of the invention.

FIG. 5 illustrates the use of single protocol adaptation layers at Access Modem Termination System (AMTS) and Access Modem (AM) to translate DOCSIS control messages for other access specifications.

Still referring to FIG. 5, the access modem termination system stack includes a DOCSIS-AMTS adaptation layer 505. The DOCSIS-AMTS adaptation layer 505 includes an AMTS DOCSIS-to-access protocol translator 510 and an AMTS access-to-DOCSIS protocol translator 515. The access modem termination system stack also includes access security 525, access MAC 530 and access PHY 535 that are coupled to access networks 540. The access modem stack includes a DOCSIS-AM adaptation layer 545. The DOCSIS-AM adaptation layer 545 includes an AM DOCSIS-to-access protocol translator 550 and an AM access-to-DOCSIS protocol translator 555. The access modem stack also includes access security 560, access MAC 565 and access PHY 570 that are coupled to access networks 540.

Figure 6:
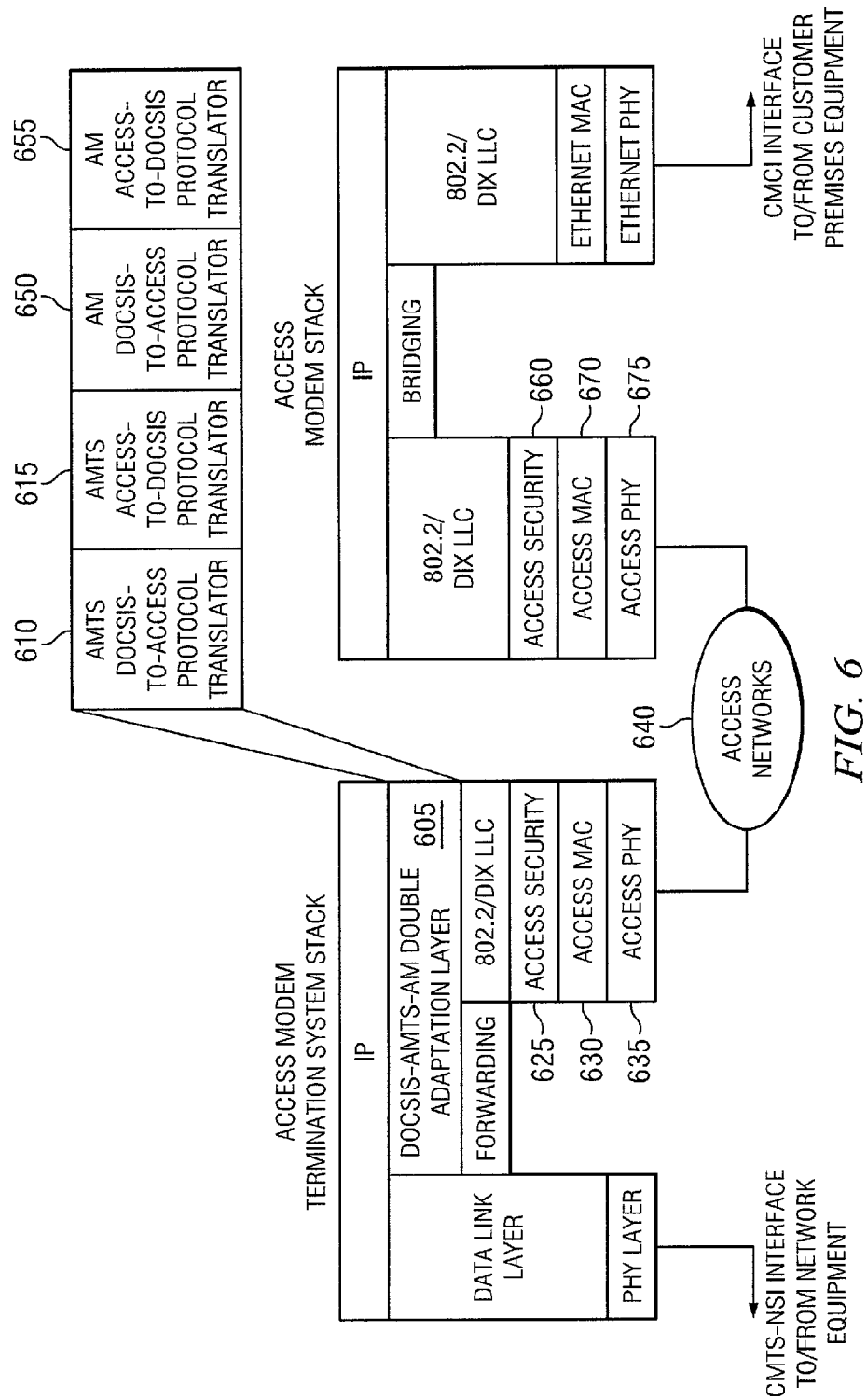
FIG. 6 is a block schematic view of a double DOCSIS protocol adaptation layer where access can be PON (BPON, EPON, GPON), Wireless (WiFi, WiMax, Proprietary), and/or Non-DOCSIS cable modem, representing an embodiment of the invention.

FIG. 6 illustrates the use of double protocol adaptation layers only at AMTS to facilitate the complete DOCSIS translation. Referring to FIG. 6, the access modem termination system stack includes a DOCSIS-AMTS adaptation layer 605. The DOCSIS-AMTS adaptation layer 605 includes an AMTS DOCSIS-to-access protocol translator 610; an AMTS access-to-DOCSIS protocol translator 615; an AM DOCSIS-to-access protocol translator 650 and an AM access-to-DOCSIS protocol translator 655. The access modem termination system stack also includes access security 625, access MAC 630 and access PHY 635 that are coupled to access networks 640. The access modem stack also includes access security 660, access MAC 665 and access PHY 670 that are coupled to access networks 640.

Figure 7:
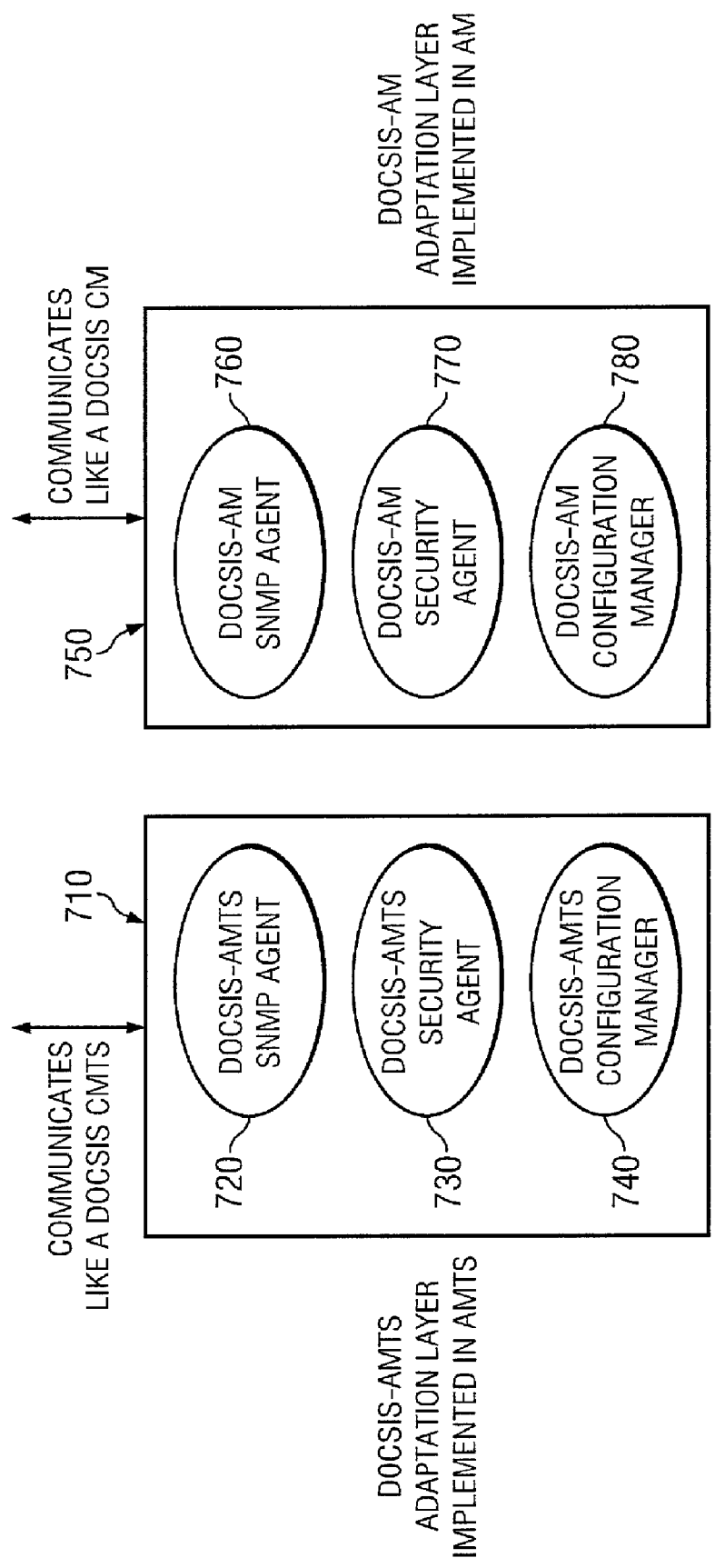
FIG. 7 is a block schematic view of an implementation of a single DOCSIS protocol adaptation layer, representing an embodiment of the invention.

FIG. 7 demonstrates the implementation of single adaptation layers at AMTS and AM to facilitate the translation of DOCSIS control messages. The DOCSIS-AMTS adaptation layer implemented in AMTS 710 includes DOCSIS-AMTS SNMP agent 720; DOCSIS-AMTS security agent 730; and DOCSIS-AMTS configuration manager 740. The DOCSIS-AM adaptation layer implemented in AM 750 includes DOCSIS-AM SNMP agent 760; DOCSIS-AM security agent 770; and DOCSIS-AM configuration manager 780.

Figure 8:
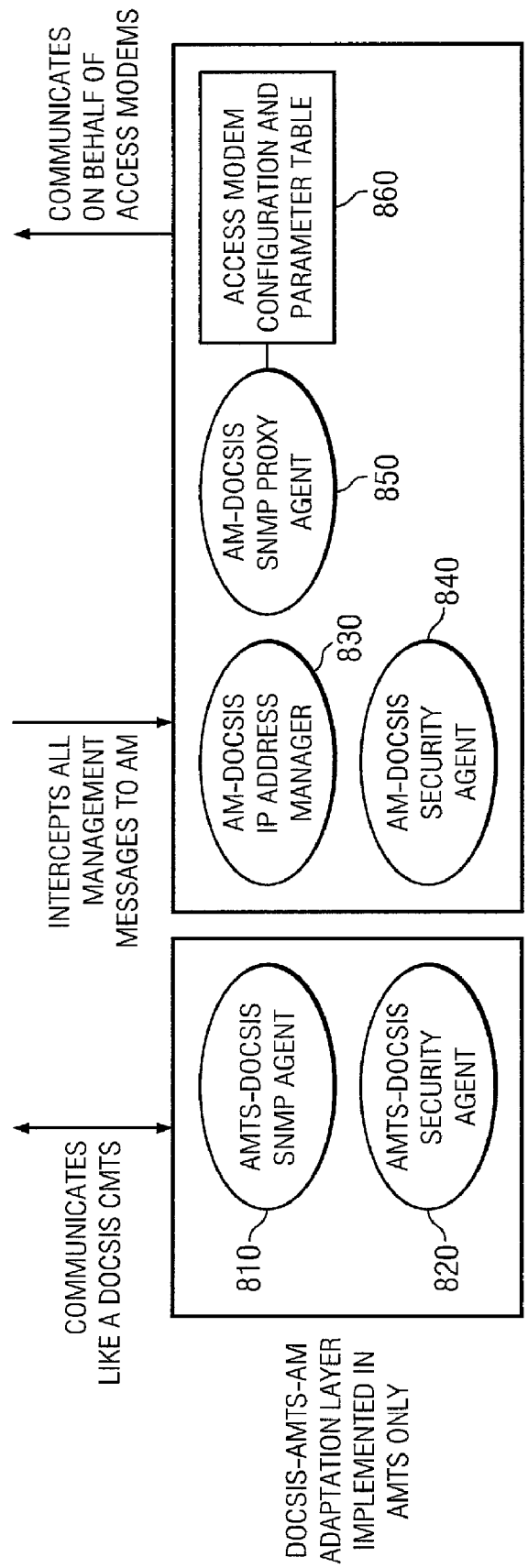
FIG. 8. is a block schematic view of an implementation of a double DOCSIS protocol adaptation layer, representing an embodiment of the invention.

FIG. 8 demonstrates the implementation of double adaptation layers at AMTS to facilitate the complete DOCSIS translation. The DOCSIS-AMTS-AM adaptation layer (implemented in AMTS only) includes an AMTS-DOCSIS SNMP agent 810 and an AMTS-DOCSIS security agent 820, which communicate like a DOCSIS CMTS. The DOCSIS-AMTS-AM adaptation layer (implemented in AMTS only) includes an AM-DOCSIS IP address manager 830 and an AM-DOCSIS security agent 840. The DOCSIS-AMTS-AM adaptation layer (implemented in AMTS only) includes an AM-DOCSIS SNMP proxy agent 850 and an access modem configuration and parameter table 860.

DEFINITIONS

The term program and/or the phrase computer program are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term distal, as used herein, is intended to mean far, away, spaced apart from and/or non-coincident, and includes spatial situation where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The term means, when followed by the term "for" is intended to mean hardware, firmware and/or software for achieving a result. The term step, when followed by the term "for" is intended to mean a (sub)method, (sub)process and/or (sub)routine for achieving the recited result.

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The terms "consisting" (consists, consisted) and/or "composing" (composes, composed) are intended to mean closed language that does not leave the recited method, apparatus or composition to the inclusion of procedures, structure(s) and/or ingredient(s) other than those recited except for ancillaries, adjuncts and/or impurities ordinarily associated therewith. The recital of the term "essentially" along with the term "consisting" (consists, consisted) and/or "composing" (composes, composed), is intended to mean modified close language that leaves the recited method, apparatus and/or composition open only for the inclusion of unspecified procedure(s), structure(s) and/or ingredient(s) which do not materially affect the basic novel characteristics of the recited method, apparatus and/or composition.

Unless otherwise defined, all technical and scientific terms used herein have the same meaning as commonly understood by one of ordinary skill in the art to which this invention belongs. In case of conflict, the present specification, including definitions, will control.

CONCLUSION

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventors is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences. The individual components of embodiments of the invention need not be combined in the disclosed configurations, but could be combined in any and all configurations.

Various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

1. Data-Over-Cable Service Interface Specifications, Cable Modem to Customer Premises Equipment Interface Specification, SP-CMCI-I10-050408
2. Data-Over-Cable Service Interface Specifications, Cable Modem Termination System Network Side Interface Specification, SP-CMTS-NSI-I01-960702
3. Data-Over-Cable Service Interface Specifications, Operations Support System Interface Specification, SP-OSSIIv2.0-I09-050812
4. Data-Over-Cable Service Interface Specifications, Radio Frequency Interface Specification, SP-RFIv2.0-I10-051209
5. Data-Over-Cable Service Interface Specifications, Baseline Privacy Plus Interface Specification, CM-SP-BPI+-I12-050801

What is claimed is:

1. A method of expanding DOCSIS into an alternative access network, comprising:
   deploying a protocol adaptation layer in access equipment to translate DOCSIS control messages to corresponding messages for use in the alternative access network; and
   translating DOCSIS control messages to corresponding messages for use in the alternative access network, the protocol adaptation layer being a DOCSIS-AMTS (Access Modem Termination System) adaptation layer, the translating including AMTS DOCSIS-to-access protocol translation and AMTS access-to-DOCSIS protocol translation in the DOCSIS-AMTS adaptation layer being located in an access-modem termination system stack above at least an access MAC layer.

2. The method of claim 1, wherein the protocol adaptation layer is a single DOCSIS protocol adaptation layer.

3. The method of claim 1, wherein the protocol adaptation layer is a double DOCSIS protocol adaptation layer and translating includes AM DOCSIS-to-access protocol translation and AM access-to-DOCSIS protocol translation.

4. The method of claim 1, wherein the alternative access network is heterogeneous.

5. A system for expanding DOCSIS into an alternative access network, comprising: a protocol adaptation layer in access equipment to translate DOCSIS control messages to corresponding messages for use in the alternative access network,
   wherein the protocol adaptation layer translates DOCSIS control messages to corresponding messages for use in the alternative access network, the protocol adaptation layer being a DOCSIS-AMTS (Access Modem Termination System) adaptation layer including an AMTS DOCSIS-to-access protocol translator and an AMTS access-to-DOCSIS protocol translator, the DOCSIS-AMTS adaptation layer being located in an access-modem termination system stack above at least an access MAC layer.

6. The system of claim 5, wherein the protocol adaptation layer is a single DOCSIS protocol adaptation layer.

7. The system of claim 5, wherein the protocol adaptation layer is a double DOCSIS protocol adaptation layer and the protocol adaptation layer includes an AM DOCSIS-to-access protocol translator and an AM access-to-DOCSIS protocol translator.

8. The system of claim 5, wherein the alternative access network is heterogeneous.

* * * * *